(12) United States Patent
Froidevaux et al.

(10) Patent No.: US 11,352,092 B2
(45) Date of Patent: Jun. 7, 2022

(54) VEHICLE WITH VARIABLE OVERALL LENGTH AND METHOD FOR SELECTIVELY CHANGING THE LENGTH

(71) Applicant: BOMBARDIER RECREATIONAL PRODUCTS INC., Valcourt (CA)

(72) Inventors: Vincent Froidevaux, Sherbrooke (CA); Eric Fournier, Orford (CA); Maxime Dumont, Verdun (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/599,778

(22) PCT Filed: Mar. 27, 2020

(86) PCT No.: PCT/IB2020/052969
§ 371 (c)(1),
(2) Date: Sep. 29, 2021

(87) PCT Pub. No.: WO2020/201970
PCT Pub. Date: Oct. 8, 2020

(65) Prior Publication Data
US 2022/0089244 A1 Mar. 24, 2022

Related U.S. Application Data

(60) Provisional application No. 62/826,446, filed on Mar. 29, 2019.

(51) Int. Cl.
*B62K 15/00* (2006.01)
*B62K 11/02* (2006.01)
*B62J 43/16* (2020.01)

(52) U.S. Cl.
CPC ............... *B62K 15/00* (2013.01); *B62J 43/16* (2020.02); *B62K 11/02* (2013.01)

(58) Field of Classification Search
CPC ........... B62J 43/16; B62K 15/00; B62K 11/02
See application file for complete search history.

(56) References Cited

U.S. PATENT DOCUMENTS

| 3,485,508 A | * | 12/1969 | Alton | ........................ | B62K 3/00 |
| | | | | | 280/234 |
| 4,641,720 A | | 2/1987 | Young | | |

(Continued)

FOREIGN PATENT DOCUMENTS

| KR | 101390874 A1 | 4/2014 |
| TW | 201601965 A | 1/2016 |

(Continued)

OTHER PUBLICATIONS

International Search Report and Written Opinion issued in corresponding international application No. PCT/IB2020/052969 dated Jul. 16, 2020, Authorized Officer: Shane Thomas.

(Continued)

*Primary Examiner* — Tony H Winner
(74) *Attorney, Agent, or Firm* — BCF LLP

(57) ABSTRACT

A vehicle including a front module including a front wheel and a rear module selectively moveably connected to the front module, the rear module including a rear wheel. The vehicle further includes an electric motor assembly, a mode selector, at least one extension assembly connected between the front module and the rear module for selectively extending and retracting to provide a selective variation in an overall length of the vehicle; and a vehicle control unit being communicatively connected between the mode selector and the electric motor assembly. The vehicle control unit performs a method for selectively changing the overall vehicle length. The method includes receiving from the mode selector an indication to change the overall length, determining that the front wheel is rotationally locked, and causing an (Continued)

electric motor to drive the rear wheel such that the rear module translates relative to the front module.

22 Claims, 10 Drawing Sheets

(56) References Cited

U.S. PATENT DOCUMENTS

| | | | | |
|---|---|---|---|---|
| 4,909,537 | A * | 3/1990 | Tratner | B62K 13/00 |
| | | | | 280/278 |
| 5,014,808 | A | 5/1991 | Savard et al. | |
| 8,540,272 | B1 * | 9/2013 | Vitale | B62D 21/14 |
| | | | | 280/638 |
| 10,328,988 | B2 * | 6/2019 | Bang | B62K 11/10 |
| 10,967,721 | B2 * | 4/2021 | Mercier | B60L 53/16 |
| 2003/0168832 | A1 | 9/2003 | Flowers et al. | |
| 2010/0163326 | A1 | 7/2010 | Takamura et al. | |
| 2011/0241310 | A1 | 10/2011 | Donahue | |
| 2014/0049022 | A1 * | 2/2014 | Dopf | B62K 3/04 |
| | | | | 280/278 |
| 2014/0265216 | A1 * | 9/2014 | Scolari | B62K 3/02 |
| | | | | 280/259 |
| 2015/0035248 | A1 * | 2/2015 | Baron | B62K 15/00 |
| | | | | 280/259 |
| 2015/0175227 | A1 | 6/2015 | Chang et al. | |
| 2018/0037288 | A1 * | 2/2018 | Bang | B62K 21/22 |
| 2020/0216117 | A1 * | 7/2020 | Chiu | B62K 3/002 |

FOREIGN PATENT DOCUMENTS

| | | |
|---|---|---|
| WO | 2014035008 A1 | 3/2014 |
| WO | WO2017168399 A1 | 10/2017 |

OTHER PUBLICATIONS

Extended Search Report for corresponding EP Application No. 20784914.2, Search completed on Mar. 14, 2022, 9 pages.

* cited by examiner

VEHICLE WITH VARIABLE OVERALL LENGTH AND METHOD FOR SELECTIVELY CHANGING THE LENGTH

CROSS-REFERENCE

The present application claims priority to U.S. Provisional Patent Application No. 62/826,446, filed Mar. 29, 2019, the entirety of which is incorporated herein by reference.

FIELD OF TECHNOLOGY

The present technology relates to vehicles with variable overall length and methods for varying overall vehicle length.

BACKGROUND

Two-wheeled vehicles, such as scooters and motorcycles, are often convenient modes of transport. This is especially true for urban environments, where distances traveled are generally shorter and average speeds are lower.

It is often desirable to be able to transport cargo, such as a driver's shopping, work bag, or an additional rider. Some vehicles are structured to provide cargo space for transporting more than a single rider. For instance, vehicles could be built in a more elongated fashion to provide for additional space between the seat and the rear wheel. Some bicycles have a cargo area between a front wheel and the handlebars. There are also full-sized tricycles, often referred to as trikes, that have cargo space between two front wheels or two rear wheels depending on the trike's wheel configuration.

In such vehicles with additional built-in cargo space, however, the overall maneuverability is often decreased. By having a longer wheel base or three-wheels instead of two, cornering is often disadvantageously affected, due to the larger wheel span or longer vehicle length.

There remains a desire for vehicles capable of carrying cargo without at least some of the inconveniences described above.

SUMMARY

It is an object of the present technology to ameliorate at least some of the inconveniences present in the prior art.

According to one aspect of the present technology, there is provided a vehicle with an adjustable overall length, such that the vehicle can be lengthened to provide space to carry additional cargo and then shortened again when the cargo space is no longer needed or desired. Extendable supports, referred to as extension assemblies, are included to provide structural integrity to the vehicle which is formed from a front module and a rear module that is moveable with respect to the front module. The present technology also provides a method for changing the overall length of the vehicle. The front wheel is locked to prevent movement of the front portion of the vehicle while the rear wheel is driven to move the rear portion of the vehicle relative to the immobile front portion.

According to one aspect of the present technology, there is provided a vehicle, including a front module including: a front frame portion; a front suspension assembly connected to the front frame portion; at least one front wheel connected to the front frame portion via the front suspension assembly; at least one front brake assembly operatively connected to the at least one front wheel; a rear module selectively moveably connected to the front module, the rear module including: a rear frame portion, a rear suspension assembly connected to the rear frame portion, at least one rear wheel connected to the rear frame portion via the rear suspension assembly, and an electric motor assembly supported by the rear frame portion, the electric motor assembly selectively driving the at least one rear wheel; a seat; a steering assembly disposed forward of the seat, the seat and the steering assembly being connected to one of the front module and the rear module; a mode selector connected to one of the front module and the rear module; a battery connected to one of the front module and the rear module, the battery being electrically connected to the electric motor assembly; at least one extension assembly connected between the front module and the rear module, the at least one extension assembly being selectively extendible and retractable to provide a selective variation in an overall length of the vehicle; and a vehicle control unit supported by one of the front module and the rear module, the vehicle control unit being communicatively connected between the mode selector and the electric motor assembly. The vehicle control unit is adapted for receiving an indication, via the mode selector, to change the overall length of the vehicle, determining that the at least one front wheel is rotationally locked, and in response to receiving the indication and determining that the front wheel is rotationally locked, causing the electric motor assembly to drive the at least one rear wheel in order to move the rear module relative to the front module.

In some implementations of the present technology, when the indication to change the overall length of the vehicle is an indication to increase the overall length of the vehicle, causing the electric motor assembly to drive the at least one rear wheel includes driving the rear wheel in reverse to move the rear module rearward relative to the front module.

In some implementations of the present technology, when the indication to change the overall length of the vehicle is an indication to reduce the overall length of the vehicle, causing the electric motor assembly to drive the at least one rear wheel includes driving the rear wheel in a forward direction to move the rear module forward relative to the front module.

In some implementations of the present technology, the battery is connected to the rear module; and the battery is disposed at least partially under the seat in at least one extension position of the front module relative to the rear module.

In some implementations of the present technology, the seat, the steering assembly, the battery, and the mode selector are connected to the front module; and selectively increasing the overall length of the vehicle creates a space within the vehicle between the seat and the at least one rear wheel.

In some implementations of the present technology, the vehicle further includes an electrical cord operatively connecting the battery to the electric motor assembly; and wherein the at least one extension assembly defines a channel therethrough, and the electrical cord extends from the front module to the rear module through the channel.

In some implementations of the present technology, the vehicle further includes a control wire communicatively connecting the vehicle control unit to the electric motor assembly, the control wire being connected between the vehicle control unit and the electric motor assembly; and wherein the vehicle control unit is supported by the front module, and the control wire extends from the vehicle control unit in the front module to the electric motor assembly in the rear module via the channel in the at least one extension assembly.

In some implementations of the present technology, the seat, the steering assembly, the battery, and the mode selector are connected to the rear module; and selectively increasing the overall length of the vehicle creates a space within the vehicle between the at least one front wheel and the seat.

In some implementations of the present technology, the at least one extension assembly includes a right extension assembly connected between a right side of the front frame portion and a right side of the rear frame portion; and a left extension assembly connected between a left side of the front frame portion and a left side of the rear frame portion.

In some implementations of the present technology, the at least one extension assembly includes at least one telescoping element.

In some implementations of the present technology, the vehicle further includes at least one sensor communicatively connected to the vehicle control unit for sensing at least one of: an extension position of the at least one extension assembly; and a position of the front module relative to the rear module.

In some implementations of the present technology, the vehicle control unit communicates with the electric motor assembly via a wireless connection.

In some implementations of the present technology, the rear suspension assembly includes a swing arm pivotably connected to the rear frame portion.

In some implementations of the present technology, the at least one front wheel is a single front wheel; and the front suspension assembly includes a fork suspension supporting the front wheel.

In some implementations of the present technology, the steering assembly includes: a steering column; a handlebar connected to a top end of the steering column; and a twist grip throttle operatively connected to the handlebar.

In some implementations of the present technology, the vehicle control unit is further adapted for actuating the at least one front brake assembly to rotationally lock the at least one front wheel; and determining that the at least one front wheel is rotationally locked includes actuating the at least one front brake assembly to rotationally lock the at least one front wheel.

In some implementations of the present technology, the vehicle further includes at least one brake sensor operatively connected to the at least one front brake assembly, the at least one brake sensor being communicatively connected to the vehicle control unit, the at least one brake sensor being operable to send a signal, to the vehicle control unit, indicating that the at least one front wheel is rotationally locked by the at least one front brake assembly.

In some implementations of the present technology, the vehicle further includes a speed sensor for sensing a speed of the vehicle, the speed sensor being communicatively connected to the vehicle control unit, the speed sensor being operable to send a signal, to the vehicle control unit, indicating that the vehicle is immobilized prior to causing the electric motor assembly to drive the at least one rear wheel.

In some implementations of the present technology, the at least one extension assembly includes at least one lock for locking an extension position of the at least one extension assembly.

According to another aspect of the present technology, there is provided a method for selectively changing an overall length of a vehicle. The method includes receiving, by a vehicle control unit, from a mode selector, an indication to change the overall length of the vehicle, the vehicle including a front module and a rear module connected together by at least one extension assembly, the front module including: at least one front wheel, and at least one front brake assembly operatively connected to the at least one front wheel; determining, by the vehicle control unit, that the at least one front wheel is rotationally locked; and causing, by the vehicle control unit, an electric motor assembly of the rear module to drive at least one rear wheel of the rear module such that the rear module translates relative to the front module.

In some implementations of the present technology, determining that the at least one front wheel is rotationally locked includes determining that the at least one front brake assembly has been actuated to brake the at least one front wheel.

In some implementations of the present technology, determining that the at least one front wheel is rotationally locked includes actuating the at least one front brake assembly to rotationally lock the at least one front wheel.

In some implementations of the present technology, determining that the at least one front wheel is rotationally locked further includes: detecting that the at least one front wheel is not rotationally locked, and in response to detecting that the at least one front wheel is not rotationally locked, actuating the at least one front brake assembly to rotationally lock the at least one front wheel.

In some implementations of the present technology, the method further includes causing, by the vehicle control unit, the at least one front brake assembly to actuate to brake the at least one front wheel, prior to causing the electric motor assembly to drive the at least one rear wheel.

In some implementations of the present technology, the method further includes causing, by the vehicle control unit, the at least one front brake assembly to release the at least one front wheel to rotationally unlock the at least one front wheel, subsequent to causing the electric motor assembly to drive the at least one rear wheel.

In some implementations of the present technology, the method further includes determining by the vehicle control unit that the vehicle is immobilized, prior to causing the electric motor assembly to drive the at least one rear wheel.

In some implementations of the present technology, the method further includes causing, by the vehicle control unit, the at least one extension assembly to unlock, prior to causing the electric motor assembly to drive the at least one rear wheel; and wherein when unlocked, the at least one extension assembly is capable of at least one of selectively extending and selectively retracting.

In some implementations of the present technology, the method further includes causing, by the vehicle control unit, the at least one extension assembly to lock, subsequent to causing the electric motor assembly to drive the at least one rear wheel; and wherein when locked, the at least one extension assembly has a fixed length and impedes changes in the overall length of the vehicle.

In some implementations of the present technology, causing the electric motor assembly to drive the at least one rear wheel includes causing the electric motor assembly to drive the at least one rear wheel in reverse in order to increase the overall length of the vehicle and to cause the at least one extension assembly to extend.

In some implementations of the present technology, causing the electric motor assembly to drive the at least one rear wheel includes causing the electric motor assembly to drive the at least one rear wheel forward in order to decrease the overall length of the vehicle and to cause the at least one extension assembly to retract.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
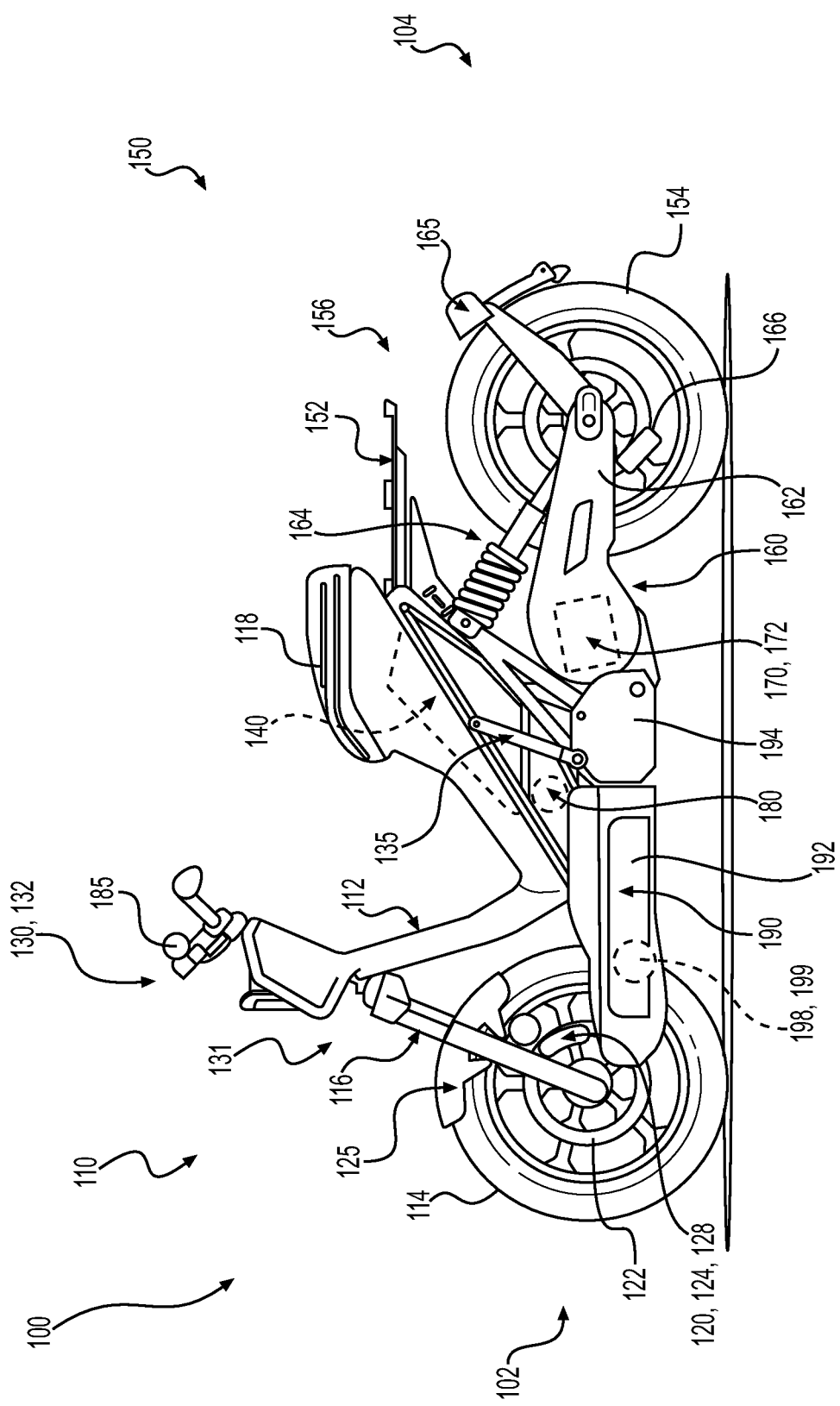
FIG. 1 is a left side elevation view of a vehicle according to the present technology, with the vehicle in a retracted position.
Figure 2:
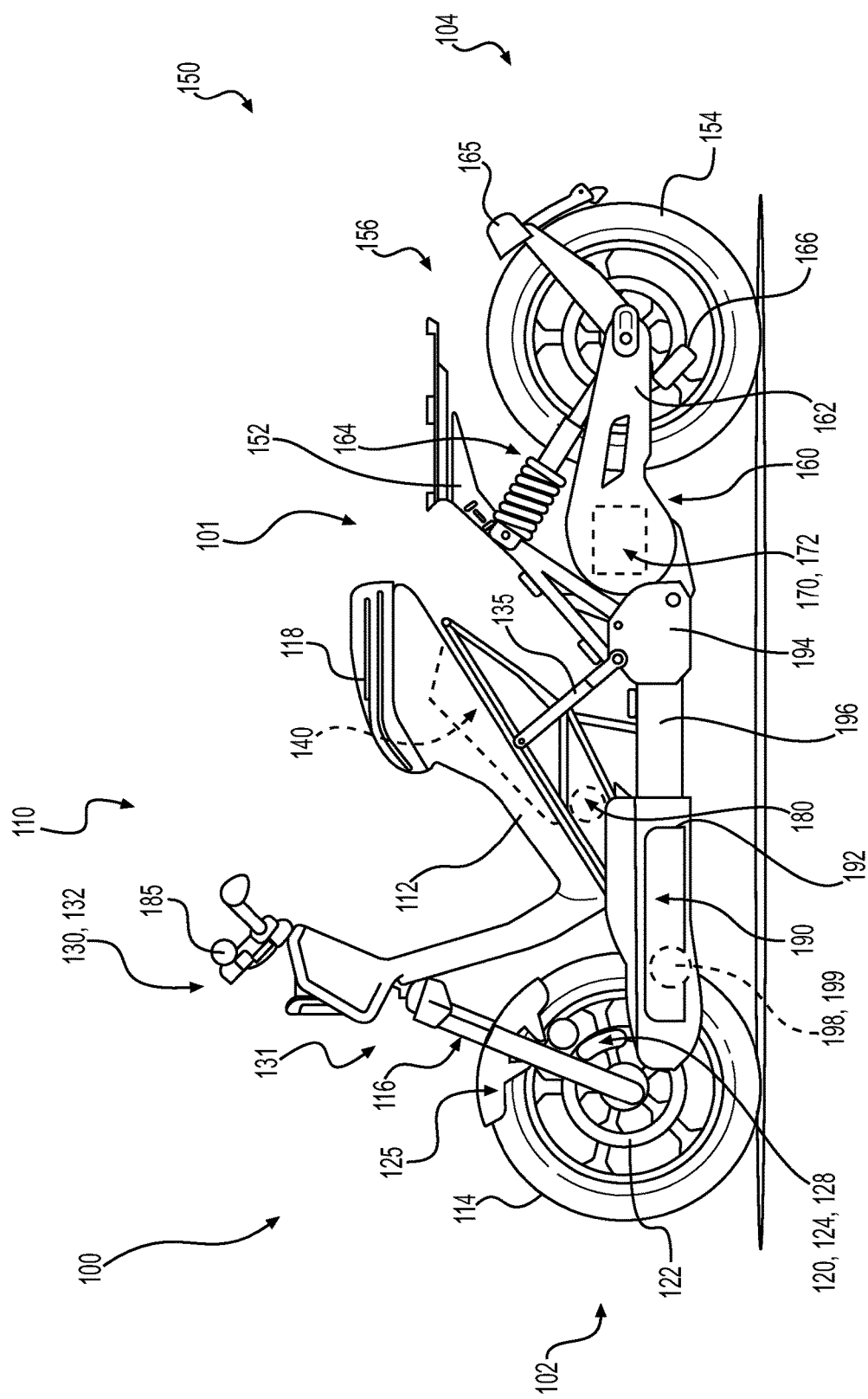
FIG. 2 is a left side elevation view of the vehicle of FIG. 1, with the vehicle in a partially-extended position.

It should be noted that, unless otherwise explicitly specified herein, the drawings are not necessarily to scale.

DETAILED DESCRIPTION

The present technology will be described herein with respect to a two-wheeled straddle-seat electric vehicle 100. As illustrated, the vehicle 100 is specifically an electric scooter 100, but at least some aspects of the present technology could also be implemented in different two-wheeled vehicles such as motorcycles. It is also contemplated that at least some aspects of the present technology could also be implemented with straddle-seat vehicles having three wheels, including vehicles with two front wheels and one rear wheel and vehicles with one front wheel and two rear wheels.

The vehicle 100, according to the present technology, will now be described in detail with reference to FIGS. 1 to 6. The vehicle 100 has a front end 102 and a rear end 104 defined consistently with the forward travel direction of the vehicle 100. As will be described herein, the vehicle 100 has a selectively variable overall length. As such, a size of a storage space 101 defined in the vehicle 100 between the front end 102 and the rear end 104 (see FIGS. 3 and 4) can be selectively longitudinally increased or decreased (i.e. along the direction of forward travel) according to the need or desire of an operator of the vehicle 100.

The vehicle 100 is formed from two connected subsections, referred to herein as modules. Specifically, the vehicle 100 is formed from a front module 110 and a rear module 150. The front module 110 includes the front end 102 and is disposed forward of the rear module 150 which includes the rear end 104. The modules 110, 150 are selectively moveably connected together by two extension assemblies 190, described in more detail below.

The front module 110 has a front frame portion 112 on which various components of the vehicle 100 are supported. The front module 110 includes a front wheel 114 mounted to the front frame portion 112 by a front suspension assembly 116. The front wheel 114 includes a rim and a tire connected thereto. In the present implementation, the front suspension assembly 116 is a fork suspension 116 supporting the front wheel 114. Depending on the implementation, different types of suspension assemblies could be used as the front suspension assembly 116 to support the front wheel 114.

The front module 110 also includes a straddle seat 118 mounted to the front frame portion 112 and generally laterally aligned with the front and rear wheels 114, 154. In the illustrated implementation, the straddle seat 118 is intended to accommodate a single adult-sized rider, i.e. the driver. It is contemplated that the vehicle 100 could also be provided with one or more passenger seats disposed rearward of the driver seat 118, either connected to the front module 110 or the rear module 150 depending on the implementation. It is also contemplated that the straddle seat 118 could include a passenger seat portion for accommodating a passenger on the seat 118 along with the driver.

Disposed below the straddle seat 118, a battery 140 is part of the front module 110 and is supported by and connected to the front frame portion 112. The battery 140 provides power to an electric motor assembly 170 which drives the vehicle 100. The vehicle 100 includes an electrical cord 141 (FIG. 3) electrically and operatively connecting the battery 140 to the electric motor assembly 170. As the electric motor assembly 170 is disposed on the rear module 150, the electrical cord 141 extends from the front module 110 to the rear module 150. Further details relating to the electric motor assembly 170 and the connection of the battery 140 to the electric motor assembly 170 are set out below.

As can be seen in other implementations (and as will be further described below), the battery 140 could be connected to a rear frame portion 152 of the rear module 150. In some implementations, the battery 140 could be disposed only partially under the seat 118. It is also contemplated that the battery 140 could be disposed on the vehicle 100 at a position other than below the seat 118.

The front module 110 includes a steering assembly 130 disposed forward of the seat 118 for steering the vehicle 100. The steering assembly 130 includes a steering column 131 connected to the front suspension assembly 116. A top end of the steering column 131 is connected a handlebar 132. The handlebar 132 is used by the driver to turn the front wheel 114, via the steering column 131, to steer the vehicle 100. On the right side of the handlebar 132 is operatively connected a twist-grip throttle 133 (see FIGS. 4 and 5) for controlling vehicle speed. It is contemplated that the twist-grip throttle 133 could be replaced by a throttle lever or some other type of throttle input device.

The front module 110 also includes a front fender assembly 125. The front fender assembly 125 is connected to the front suspension assembly 116 and extends over a portion of a top side of the front wheel 114. It is contemplated that the front fender assembly 125 could be omitted.

The front module 110 also includes a front brake assembly 120 operatively connected to the front wheel 114. The front brake assembly 120 is a disc-type brake assembly mounted onto the spindle of the front wheel 114. Other types of brake assemblies are contemplated. Each brake assembly 120 includes a rotor 122 mounted onto the wheel hub and a stationary caliper 124 straddling the rotor 122. The brake pads (not shown) are mounted to the caliper 124 so as to be disposed between the rotor 122 and the caliper 124 on either side of the rotor 122. The front brake assembly 120 also includes hydraulic lines (not shown) for actuating the caliper 124 to brake the front wheel 114. In some implementations, the front brake assembly 120 could include an electric solenoid for electronically controlling actuation of the calipers 124 to brake the front wheel 114.

The front module 110 includes an immobilization sensor 128 (shown schematically) for detecting the immobilization of the front wheel 114. In the illustrated implementation, the immobilization sensor 128 is a brake sensor 128 that forms part of the front brake assembly 120. The brake sensor 128 is included for sensing when the front brake assembly 120 has been actuated and the front wheel 114 has been rotationally locked by the brake assembly 120. Use of the brake sensor 128 will be described further below. It is contemplated that in an alternate implementation the immobilization sensor 128 could be a front wheel speed sensor operable, inter alia, to detect when the front wheel speed is zero.

The handlebar 132 includes two brake levers 134 (see FIGS. 4 and 5) for controlling braking of the vehicle 100. The left brake lever 134 is operatively connected to the front brake assembly 120. The right brake lever 134 is connected to a rear brake assembly 166 operatively connected to the rear wheel 154. The rear brake assembly 166 is similar to the front brake assembly 120, but could be implemented in a number of forms and will not be described in more detail herein. In some implementations, the front and rear brake assemblies 120, 166 are part of a vehicle stability system that further includes a hydraulic pump, manifold and valves in fluidic connection with the brake assemblies 120, 166. In such implementations, the brake sensor 128 could be a hydraulic pressure sensor 128 located in the hydraulic manifold at a position remote from the brake assemblies 120, 166.

It is also contemplated that the brake levers 134 could be replaced by different control mechanisms for controlling the brake assemblies 120, 166. For example, in some implementations the vehicle 100, brake pedals connected to the front frame portion 112 could be included. It is also contemplated that both brake assemblies 120, 166 could be controlled by the same mechanism, for example only one brake lever 134. It is further contemplated that one of the two brake levers 134 could be for controlling the regenerative braking function of the electric motor assembly 170, while the other brake lever 134 controls the brake assemblies 120, 160. It is also contemplated that a single brake lever 134 could be used to control a regenerative braking function and the brake assemblies 120, 160.

In the present implementation, the right brake lever 134 controls the rear brake assembly 166 by a "control-by-wire" arrangement, while the left brake lever 134 is mechanically linked to the front brake assembly 120, including via a hydraulic fluid pump (not shown) and the hydraulic lines. This is simply one non-limiting example of a brake control arrangement. In different implementations, the control of the front and rear brake assemblies 120, 166 by the brake levers 134 could be implemented in different ways.

Depending on the specific implementation, the front module 110 could include additional, or fewer, components of the vehicle 100.

The rear module 150 will now be described in more detail. Similarly to the front module 110, the rear module 150 could include additional or fewer components of the vehicle 100.

The rear module 150 includes the rear frame portion 152 on which various components of the vehicle 100 are supported. The rear module 150 includes the rear wheel 154 mounted to the rear frame portion 152 by a rear suspension assembly 156. The rear wheel 154 includes a rim and a tire connected thereto.

In the present implementation, the rear suspension assembly 156 includes a swing arm assembly 160. In some cases, the rear suspension assembly 156 could be differently implemented. The swing arm assembly 160 includes a swing arm 162 and a shock absorber 164. The swing arm 162 is pivotally mounted at a front thereof to the rear frame portion 152. The shock absorber 164 is connected between the swing arm 162 and the rear frame portion 152.

The rear wheel 154 is rotatably mounted to the rear end of the swing arm 162 which extends on a left side of the rear wheel 154. The rear module 150 also includes the electric motor assembly 170, mentioned briefly above. The rear wheel 154 is operatively connected to the electric motor assembly 170 in order to selectively drive the rear wheel 154 propel the vehicle 100 via the rear wheel 154. In some implementations, the electric motor assembly 170 could alternatively be connected to the front wheel 114 to form an all-wheel or front-wheel drive vehicle.

The rear module 150 also includes a rear fender assembly 165. The rear fender 165 extends rearward from the swing arm 162, and then behind the rear wheel 154. It is contemplated that the rear fender assembly 165 could be omitted.

Figure 4:
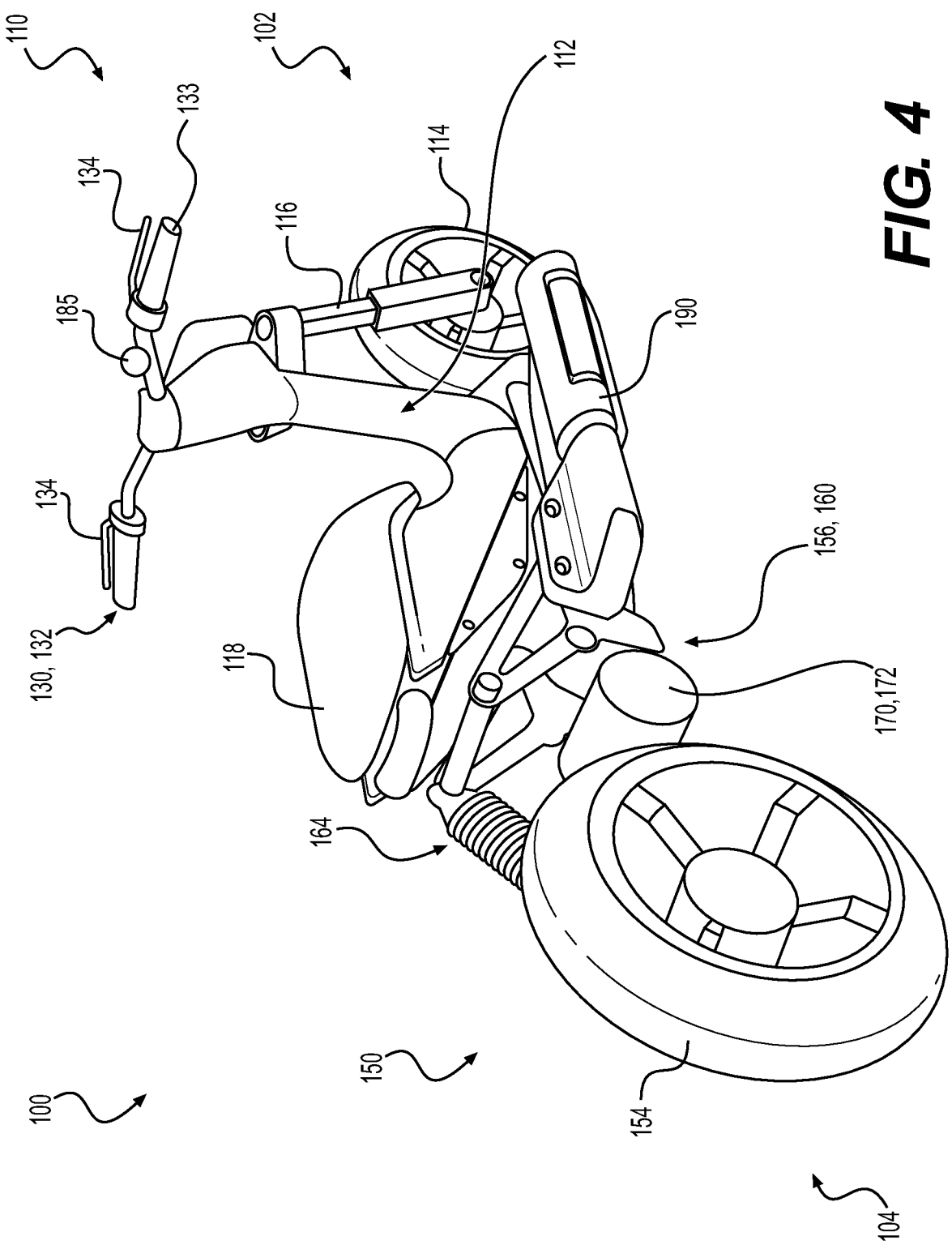
FIG. 4 is a rear, right side perspective view of the vehicle of FIG. 1, with the vehicle in a retracted position and with some elements of the vehicle having been removed.
Figure 5:
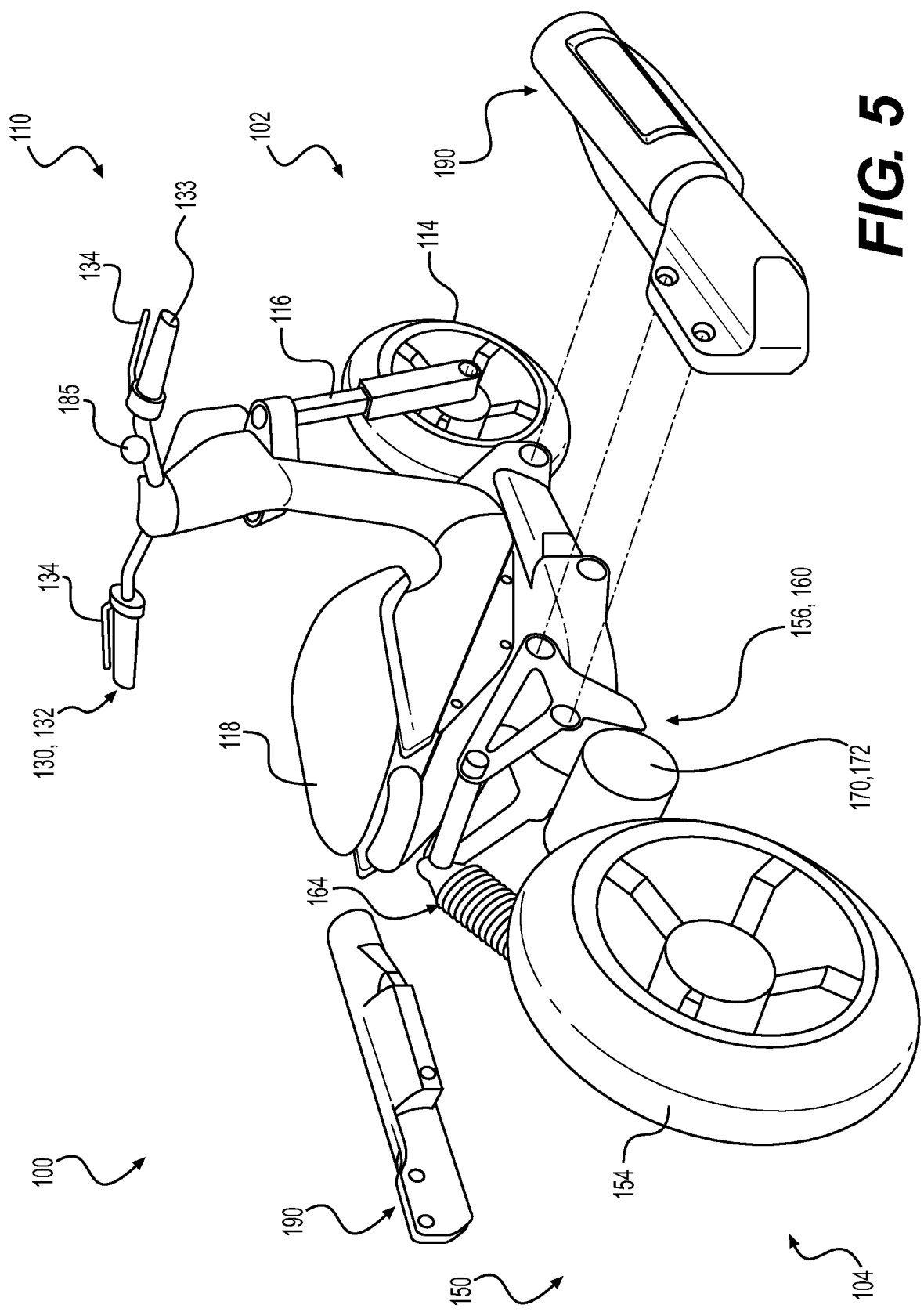
FIG. 5 is a partially exploded view of the vehicle of FIG. 4.
Figure 6:
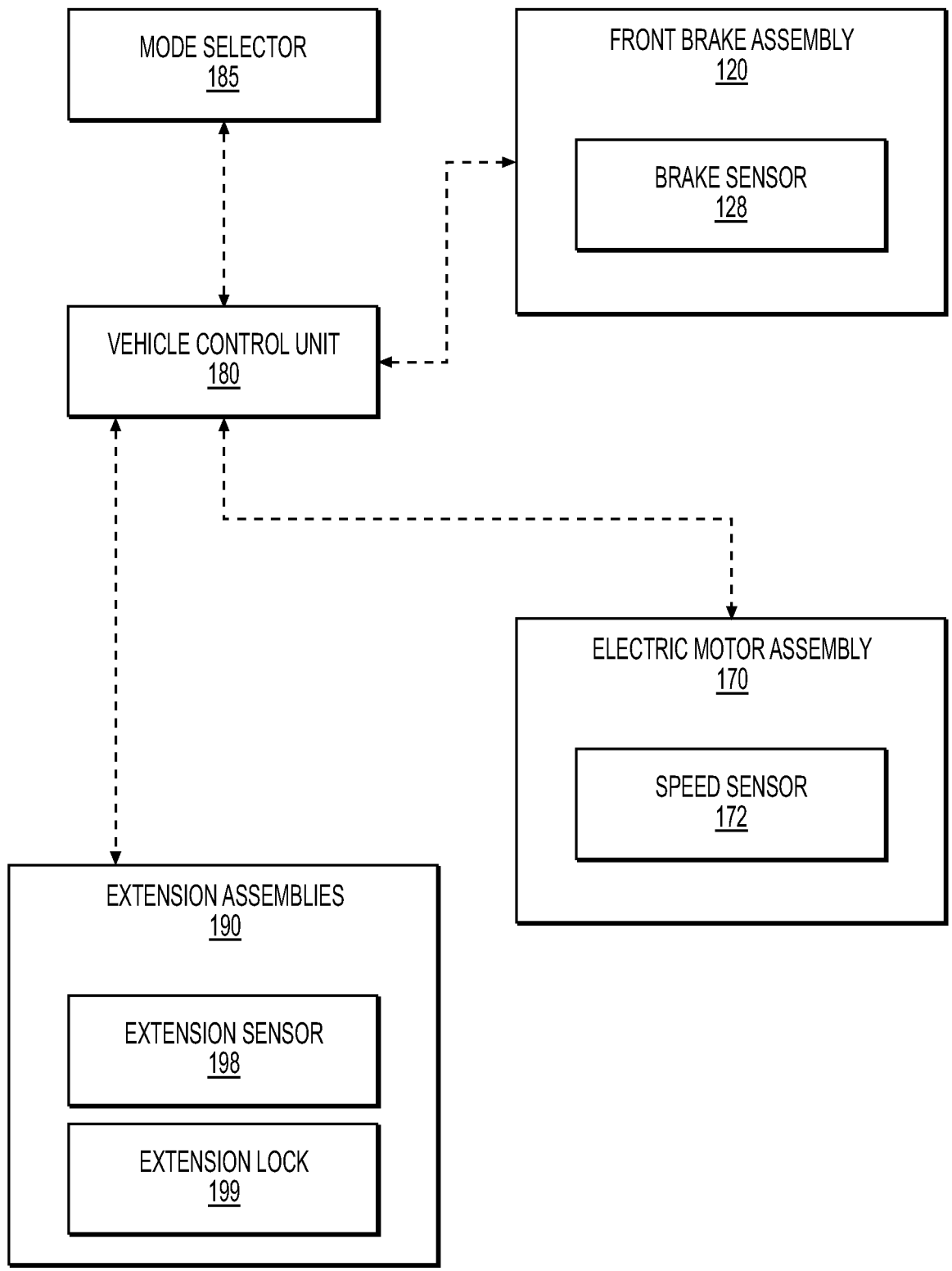
FIG. 6 is a schematic diagram illustrating connections between some components of the vehicle of FIG. 1.

The electric motor assembly 170 is supported by the swing arm 162, as can be seen in FIGS. 4 and 5. It is contemplated, however, that the electric motor assembly 170 could be supported by the rear frame portion 152 in some implementations.

The electric motor assembly 170 includes an electric motor (not shown separately) and an inverter (not shown separately, also referred to as a motor controller, an adjustable-speed drive or a variable-speed drive) for controlling electricity flow from the battery 140 to the electric motor. The electric motor assembly 170 is communicatively connected to the twist-grip throttle 133 on the handle 132 for receiving signals therefrom for controlling the speed at which the electric motor assembly 170 drives the rear wheel 154.

The vehicle 100 includes a speed sensor 172 for sensing a speed of the vehicle 100 and for sending signals relating to the speed of the vehicle 100 and/or indicating that the vehicle 100 is immobilized as will be explored in more detail below. In the present implementation, the speed sensor 172 is part of the electric motor assembly 170, although it is contemplated that the speed sensor 172 could be differently disposed or implemented. For example, the speed sensor 172 could be directly connected to the front wheel 114 and/or the rear wheel 154.

As is mentioned briefly above, the vehicle 100 includes two extension assemblies 190 to selectively moveably connect the rear module 150 to the front module 110.

Specifically, there is a right extension assembly 190 connected between a right side of the front frame portion 112 and a right side of the rear frame portion 152, as well as a left extension assembly 190 connected between a left side of the front frame portion 112 and a left side of the rear frame portion 152.

In some implementations, it is contemplated that the vehicle 100 could include just one extension assembly 190, on the right side, the left side, or along a bottom side of the frame portions 112, 152. It is also contemplated that the vehicle 100 could include more than two extension assemblies 190, depending on the particulars of the vehicle implementation. The extension assemblies 190 are selectively extendible and retractable mechanisms that provide and support a selective variation in the overall length of the vehicle 100.

In the present implementation, the vehicle 100 is selectively variable between three different overall lengths characterized by three extension positions of the extension assemblies 190: retracted, partially-extended, or extended. In the retracted position, shown in FIG. 1, the storage space 101 is fully collapsed, the extension assemblies 190 are fully retracted, and the vehicle 100 has its minimum overall length. In the extended position, shown in FIG. 3, the storage space 101 is fully extended, the extension assemblies 190 are fully extended, and the vehicle 100 is arranged in its maximum overall length. In the partially-extended position, shown in FIG. 2, the storage space 101 and the extension assemblies 190 are partially extended and the vehicle 100 has an overall length intermediate the minimum overall length of the vehicle 100 and the maximum overall length of the vehicle 100. In some implementations, the vehicle 100 could have more or fewer extension positions, including in some cases being only selectively arrangeable between the minimum overall length and the maximum overall length. In the other implementations, the vehicle 100 could be controllable to be arranged at any overall length between the minimum overall length and the maximum overall length.

While the extension assemblies 190 do not control the relative positioning of the front and rear modules 110, 150 (control of the relative positioning will be described below), the extension assemblies 190 are extendible/retractable mechanisms that provide rigidity and support between the front and rear modules 110, 150 to help maintain structural integrity of the vehicle 100 for different extension positions of the front and rear modules 110, 150.

In the present implementation, the vehicle 100 also includes an extendable support rod 135, pivotably connected between the front module 110 and the rear module 150, to aid in maintaining rigidity of the vehicle 100 when in the partially extended and extended positions. It is contemplated that the vehicle 100 could include additional, or no, extendible support rods 135, depending on the particular implementation. In some implementations, it is also contemplated that the vehicle 100 could include a collapsible or telescoping floor portion between the front module 110 and the rear module 150.

Each extension assembly 190 includes a forward portion 192 connected to the front module 110 and a rearward portion 194 connected to the rear module 150. In the present implementation, the forward and rearward portions 192, 194 are fastened to the front and rear modules 110, 150, but it is contemplated that the extension assemblies 190 could be differently connected to the front and rear modules 110, 150.

Each extension assembly 190 also includes an intermediate portion 196, integrally connected to the rearward portion 194 and slidably connected to the forward portion 192. Specifically, the intermediate portion 196 is a telescoping element 196 that is received within the forward portion 192 when the rearward portion 194 is translated forward toward the forward portion 192. It is contemplated that the extension assemblies 190 could include additional telescoping portions. It is also contemplated that the extension assemblies 190 could utilize a different mechanism to allow expansion and retraction. For instance, in some implementations the extension assemblies 190 could include non-telescoping elements such as flexing or accordion elements.

Figure 3:
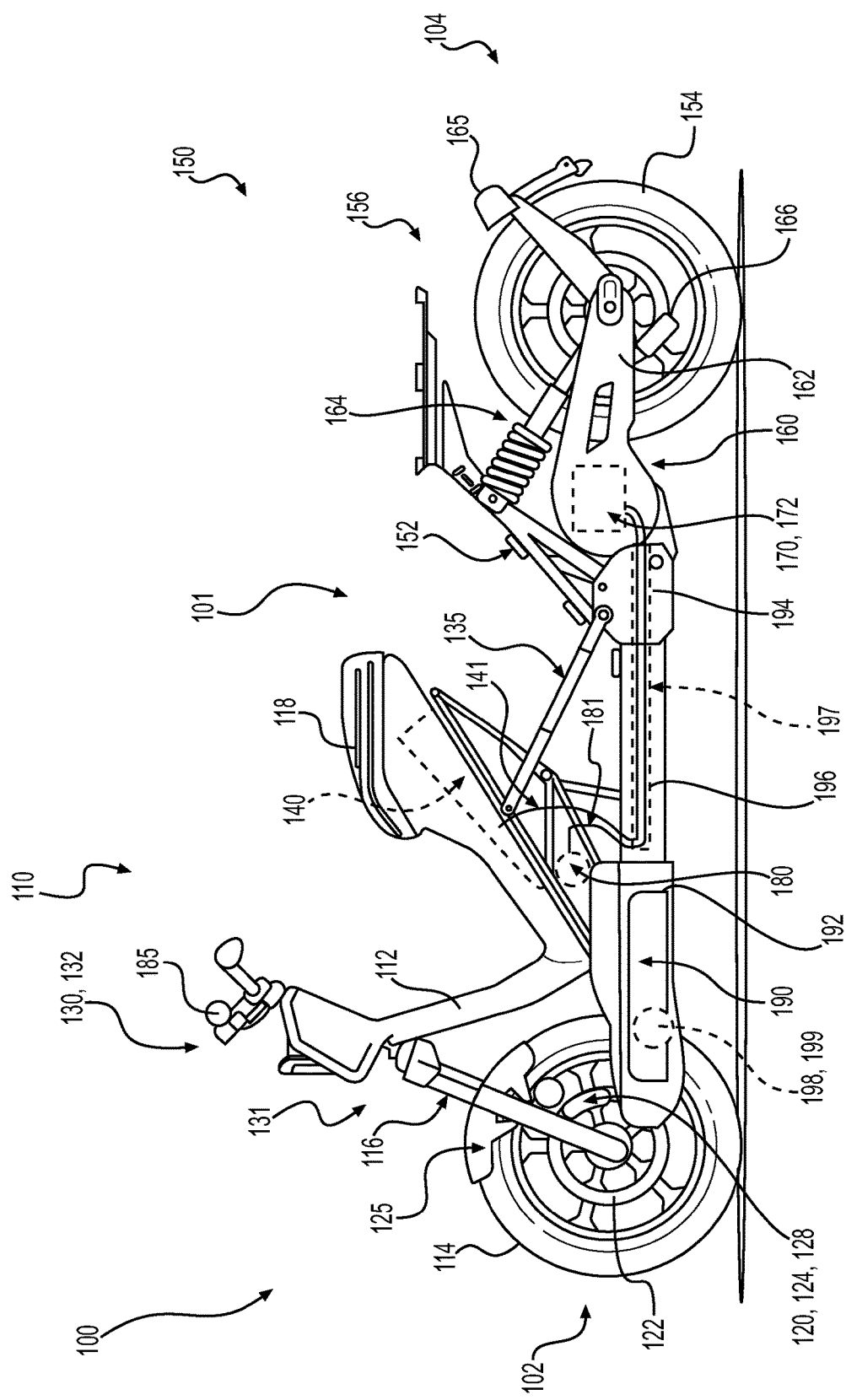
FIG. 3 is a left side elevation view of the vehicle of FIG. 1, with the vehicle in an extended position.

As is illustrated schematically in FIG. 3, the left extension assembly 190 defines a channel 197 therethrough in order to extend wiring (control wires, cables, electrical wiring, etc.) from the front module 110 to the rear module 150. By passing the wiring through the extension assembly 190, the channel 197 aids in both protecting the wiring from operational interference (getting caught on obstacles, etc.) as well as improving the aesthetic character of the vehicle 100 (hiding the wiring from view). In the present implementation, the electrical cord 141 connecting the battery 140 to the electric motor assembly 170 extends from the front module 110 to the rear module 150 through the channel 197. In some implementations, the cord 141 is a spring coiled cord such that the length of the cord 141 can increase when the overall length of the vehicle 100 is increased.

The left extension assembly 190 includes an extension sensor 198 for sensing the extension position of the extension assembly 190. In some implementations, the extension sensor 198 could additionally or alternatively sense the position of the front module 110 relative to the rear module 150.

The left extension assembly also includes an extension lock 199 to selectively lock the extension position of the extension assembly 190. The extension lock 199 aids in impeding retraction and/or extension of the extension assembly 190 when not intended, and thus limit changes to the overall length of the vehicle 100, for instance while the vehicle 100 is traveling or maneuvering. As the extension assemblies 190 and the front and rear modules 110, 150 are fairly rigid, it is sufficient to lock one of the extension assemblies 190 in order to lock the overall length of the vehicle 100. In some implementations, the extension lock 199 could automatically lock the extension assembly 190 whenever the vehicle 100 is in motion.

While the extension sensor 198 and extension lock 199 are part of the left extension assembly 190 in the present implementation, this is simply one non-limiting example. In some implementations, the sensor 198 and the lock 199 could be present in the right extension assembly 190, either in place of the sensor 198 and the lock 199 of the left extension assembly 190, or in addition to them. It is also contemplated that the extension sensor 198 could be present in one of the extension assemblies 190, while the extension lock 199 could be included in the other extension assembly 190.

In order to control the selective overall length of the vehicle 100 and to selectively increase or decrease the storage space 101 defined in the vehicle 100, the vehicle 100 includes a vehicle control unit 180 (shown schematically) disposed in the front module 110. Depending on the implementation, the vehicle control unit 180 could be instead disposed in the rear module 150.

The vehicle control unit 180 is a computer-implemented device capable of receiving and sending electronic signals and commands. While in the present implementation the vehicle control unit 180 is a separate device, it is contemplated that the vehicle control unit 180 could be implemented as part of another computational system in the vehicle 100. For example, the vehicle control unit 180 could be implemented by a motor control unit managing the electric motor assembly 170.

The vehicle control unit 180 controls the selective variation of overall length of the vehicle 100 by communicating with components of the vehicle 100, including the electric motor assembly 170, used to vary the overall length of the vehicle 100 (described in detail below). As is illustrated schematically in FIG. 6, the vehicle control unit 180 is communicatively connected to various components related to selectively varying the overall length of the vehicle 100, including the electric motor assembly 170, the front brake assembly 120, the brake sensor 128, the speed sensor 172, the extension sensor 198, and the extension lock 199. In implementations including a hydraulic pump in fluidic connection with the brake assemblies 120, 166, the vehicle control unit 180 can be communicatively connected to the front brake assembly 120 via a hydraulic pump, manifold, and valves.

The vehicle 100 includes a control wire 181 communicatively connecting the vehicle control unit 180 to the electric motor assembly 170. As is described below with reference to another implementation, in some cases the vehicle control unit 180 and the electric motor assembly 170 could be wirelessly connected or differently connected. As the vehicle control unit 180 is disposed in the front module 110 and the electric motor assembly 170 on the rear module 150, the control wire 181 extends from the vehicle control unit 180 to the electric motor assembly 170 via one of the extension assemblies 190. Specifically, the control wire 181 extends from the vehicle control unit 180 to the electric motor assembly 170 via the channel 197 in the left extension assembly 190. As is mentioned above, it is contemplated that the right extension assembly 190 could alternatively or additionally define a channel therein. In such a case, the control wire 181 could extend through the right extension assembly 190 instead. In some implementations, the control wire 181 could be a spring coiled cord to adapt to the selective variation in distance between the vehicle control unit 180 and the electric motor assembly 170.

As is mentioned above, the vehicle control unit 180 is communicatively connected to the front brake assembly 120 and is adapted for actuating the front brake assembly 120 to rotationally lock the front wheel 114. Described in more detail below, in some cases the vehicle control unit 180 causes the front brake assembly 120 to actuate and thereby rotationally lock the front wheel 114. The vehicle control unit 180 is also communicatively connected to the brake sensor 128, in order to receive one or more signals from the brake sensor 128 indicating that the front wheel 114 is (or is not) rotationally locked by the front brake assembly 120. As will be described below, the vehicle control unit 180 in some implementations then bases control of the selective variation in the overall length of the vehicle 100 depending on the signals received from the brake sensor 128.

The extension sensor 198 is also communicatively connected to the vehicle control unit 180. The extension sensor 198 provides an indication to the vehicle control unit 180 of the extension position of the extension assembly 190 and/or the position of the front module 110 relative to the rear module 150, depending on the particular implementation.

The speed sensor 172 is also communicatively connected to the vehicle control unit 180. The speed sensor 172 provides one or more signals to the vehicle control unit 180 indicating the speed of the vehicle 100 and/or indicating that the vehicle 100 is immobilized, depending on the particular implementation.

In order to receive an indication from the operator as to the desired extension position of the vehicle 100, the vehicle 100 includes a mode selector 185 communicatively connected to the vehicle control unit 180. The mode selector 185 allows the operator to choose between one of the three extension positions: retracted, partially-extended, or extended. In implementations where the vehicle 100 has more or fewer extension positions, it is contemplated that the mode selector 185 could be correspondingly configured to choose from the different extension positions.

The mode selector 185 is disposed on and connected to the handlebar 132 in the front module 110 in the present implementation. As such, the mode selector 185 is disposed within easy reach of the operator, in order to facilitate selectively changing the overall length of the vehicle 100. In some implementations, however, the mode selector 185 could be disposed elsewhere on the vehicle 100. In some implementations, the mode selector 185 could be placed near the seat 118, for example. As will be described with reference to another implementation herein, the mode selector 185 can also be connected to the rear module 150.

The mode selector 185 is arranged and structured to receive an indication from the operator indicating that the operator desires to change the overall length of the vehicle 100, which is then communicated to the vehicle control unit 180, to instruct the vehicle 100 to retract or extend the rear module 150 relative to the front module 110. In the present implementation, the mode selector 185 is an option on a multifunction gauge formed by an interactive screen device. It is contemplated that the mode selector 185 could be implemented in a variety of forms, including but not limited to: a switch, a dial, a button, and a plurality of buttons.

Figure 7:
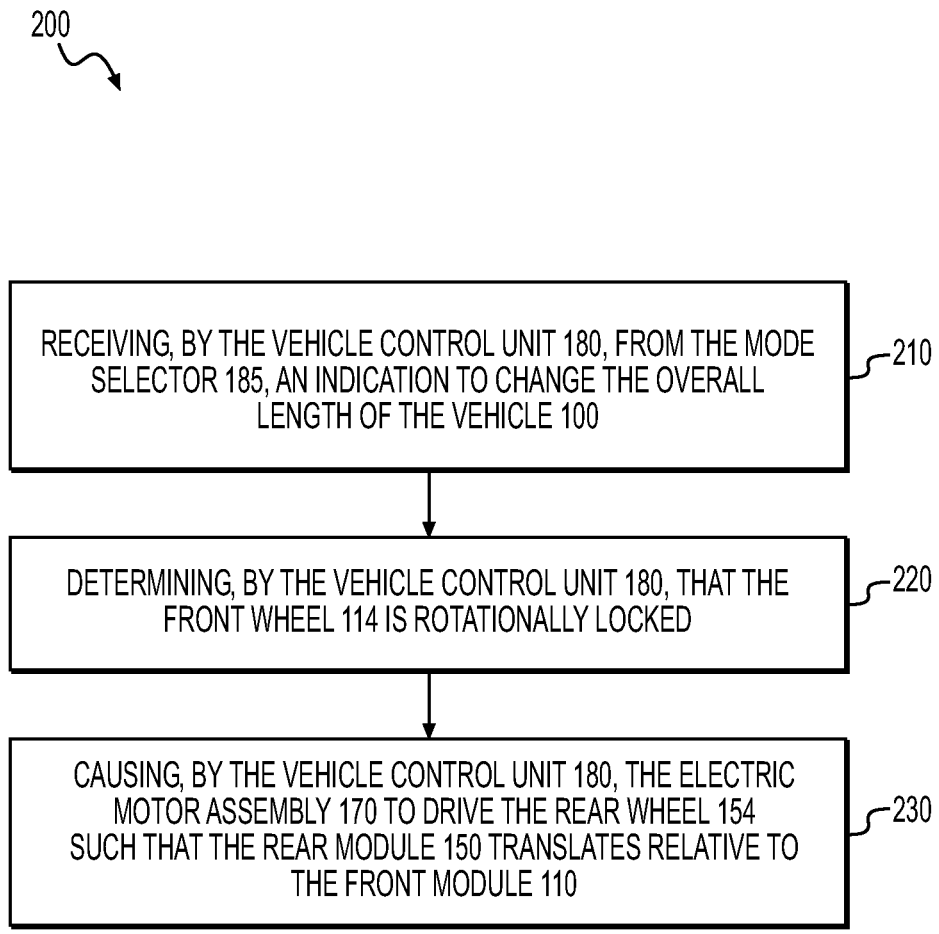
FIG. 7 is a schematic flow chart of a method for selectively changing an overall length of the vehicle of FIG. 1.

With the seat 118, the steering assembly 130, the battery 140, and the mode selector 185 all connected to the front module 110, selectively increasing the overall length of the vehicle 100 creates the storage space 101 within the vehicle 100 between the seat 118 and the rear wheel 154. With additional reference to FIG. 7, a method 200 for selectively changing the overall length of the vehicle 100 will now be described.

The method 200 is performed by the vehicle control unit 180 in the present implementation. It is contemplated that the method 200 could be performed by a different computer implemented device of the vehicle 100, for example a control unit associated with the electric motor assembly 170.

The method 200 begins, at step 210, with receiving an indication from the mode selector 185 to change the overall length of the vehicle 100. According to the present implementation, the operator toggles the switch of the mode selector 185 to select their preferred extension position, but the details of this step will change for different implementations of the mechanism of the mode selector 185.

The method 200 continues, at step 220, with determining that the front wheel 114 is rotationally locked. According to the present implementation of the method 200, determining that the front wheel 114 is rotationally locked includes determining, based on signals receiving from the brake sensor 128, that the front brake assembly 120 has been actuated to brake the front wheel 114.

In some implementations or iterations of the method 200, determining that the front wheel 114 is rotationally locked could include actuating the front brake assembly 120 to rotationally lock the front wheel 114. Upon receiving the indication to change the vehicle overall length, in some cases, the vehicle control unit 180 could send a signal to the front brake assembly 120 to cause the assembly 120 to actuate to brake the front wheel 114. In the present implementation, the vehicle control unit 180 sends the signal to the front brake assembly 120 by sending a control signal to the brake fluid pump to actuate the front brake assembly 120 via the hydraulic lines. In some implementations, it is contemplated that the vehicle control unit 180 could be communicatively connected to an electric solenoid for electronically controlling actuation of the calipers 124 to brake the front wheel 114.

In other implementations, it is contemplated that determining that the front wheel 114 is rotationally locked could further include detecting, by the brake sensor 128, that the front wheel 114 is not rotationally locked and then subsequently actuating the front brake assembly 120 to rotationally lock the front wheel 114.

In some implementations, the front wheel 114 could be rotationally locked by means other than the front brake assembly 120. For instance, in some cases the front wheel 114 could be locked by a locking pin received through the rim of the front wheel 114 and the front frame portion 114 or brackets disposed around the front wheel 114. In some implementations, for example when the front brake assembly 120 can only be actuated via the brake lever 134, automatic application of the front brake assembly 120 may not be possible. In either case of manually braking the front wheel 114 or rotationally locking the front wheel 114 by means other than the front brake assembly 120, subsequent to determining that the front wheel 114 is not rotationally locked, the method 200 could include providing an indication or instructions to the driver to rotationally lock the front wheel 114 before the method 200 can continue. Such an indication or instructions to brake or rotationally lock the front wheel 114 could include, but are not limited to, displaying a message or other visual indication to the driver, activating a sound, and/or causing vibration of the handlebar 132.

Once it is determined at step 220 that the front wheel 114 is locked, the method 200 then terminates, at step 230, with causing the electric motor assembly 170 to drive the rear wheel 154 such that the rear module 150 translates relative to the front module 110.

At step 230, when the indication received at step 210 corresponds to a request to increase the overall length of the vehicle 100, the vehicle control unit 180 causes the electric motor assembly 170 to drive the rear wheel 154 in reverse such that the rear module 150 translates rearward relative to the front module 110. By holding the front module 110 immobile, by braking the front wheel 114 by the front brake assembly 120, while driving the rear module 150 in reverse, the extension assembly 190 is caused to extend and the overall length of the vehicle 100 increases, as does the space between the front module 110 and the rear module 150. When the partially-extended or extended position is reached (depending on the indication received at step 210), the extension sensor 198 senses that the desired position has been reached and sends a corresponding signal to the vehicle control unit 180. Based on the signal from the extension sensor 198, the vehicle control unit 180 then causes the electric motor assembly 170 to stop driving the rear wheel 154. In some cases, the vehicle control unit 180 then causes the extension lock 199 to lock the extension assembly 190 and causes the front brake assembly 120 to release front wheel 114.

At step 230, when the indication received at step 210 corresponds to a request to decrease the overall length of the vehicle 100, the vehicle control unit 180 causes the electric motor assembly 170 to drive the rear wheel 154 forward such that the rear module 150 translates forward relative to, and toward, the front module 110. By holding the front module 110 immobile by braking the front wheel 114 by the front brake assembly 120 while driving the rear module 150 forward, the extension assemblies 190 are caused to retract and the overall length of the vehicle 100 decreases, as does the space 101 between the front module 110 and the rear module 150. When the retracted or partially-extended position is reached (depending on the indication received at step 210), the extension sensor 198 senses that the desired position has been reached and sends a corresponding signal to the vehicle control unit 180. Based on the signal from the extension sensor 198, the vehicle control unit 180 then causes the electric motor assembly 170 to stop driving the rear wheel 154. In some cases, the vehicle control unit 180 then causes the extension lock 199 to lock the extension assembly 190 and causes the front brake assembly 120 to release front wheel 114.

In some implementations or iterations, the method 200 could further include, prior to causing the electric motor assembly 170 to drive the rear wheel 154, causing the left extension assembly 190 to unlock by signals sent from the vehicle control unit 180 to the extension lock 199. In some cases, the left extension assembly 190 could be unlocked manually by the operator before the electric motor assembly 170 drives the rear wheel 154, rather than being automatically performed during the method 200. When unlocked, the left extension assembly 190 would then be capable of selectively extending and/or selectively retracting. When the selected position is reached, the extension assembly 190 is then locked, as is mentioned above. In implementations with both extension assemblies including extension locks 199, the vehicle control unit 180 could cause both extension assemblies 190 to unlock. In some cases, the operator could alternatively manually unlock one or both extension assemblies 190. In such an implementation, the method 200 could further include providing an indication to the operator that one or both of the extension assemblies 190 need to be unlocked before the method 200 can proceed.

In some implementations, the method 200 further includes determining that the vehicle 100 is immobilized prior to causing the electric motor assembly 170 to drive the rear wheel 154. In some such cases, the vehicle control unit 180 could receive signals from the speed sensor 172 indicating that the vehicle 100 has a speed of zero in order to confirm that the vehicle 100 is not in motion.

In some implementations and/or iterations, the method 200 could continue, subsequent to causing the electric motor assembly 170 to drive the rear wheel 154, with causing the brake assembly 120 to release the front wheel 114 to rotationally unlock the front wheel 114. By releasing the front wheel 114, the vehicle 100 can then subsequently be driven or operated per usual. In some implementations, the operator could manually release the front wheel 114 via the brake lever 134 or the mode selector 185. In some implementations, the vehicle control unit 180 could automatically cause the brake assembly 120 to release the front wheel 114 upon completion of movement of the rear module 150.

In some implementations and/or iterations, the method 200 could include receiving, while the rear wheel 154 is being driven to change the overall length of the vehicle 100, an indication from the brake sensor 128 that the front wheel 114 is no longer rotationally locked. In such a case, the method could further include causing the electric motor assembly 170 to stop driving the rear wheel 154. In some implementations, the method 200 could further include providing an indication to the operator that the front wheel 114 has become unlocked and awaiting further action from the operator before continuing the method 200 with recommencing causing the electric motor assembly 170 to drive the rear wheel 154.

In some implementations and/or iterations, the method 200 could continue, subsequent to causing the electric motor assembly 170 to drive the rear wheel 154, with automatically causing the extension lock 199 to lock the left extension assembly 190. As is mentioned above, when the extension lock 199 has locked the extension assembly 190, the extension assembly 190 has a fixed length and impedes changes in the overall length of the vehicle. In some implementations and/or iterations, the extension lock 199 could be locked manually by the operator, rather than controlled during the method 200.

In implementations where the vehicle 100 is a front wheel drive vehicle, it is contemplated that the method 200 could be adjusted such that the vehicle control unit 180 determines that the rear wheel 154 is rotationally locked and then the vehicle control unit 180 causes the front wheel 114 to be driven such that the front module 110 translates relative to the rear module 150.

It is contemplated that the method 200 could include additional or different steps, either to perform additional functions and/or to perform the steps described above.

Figure 8:
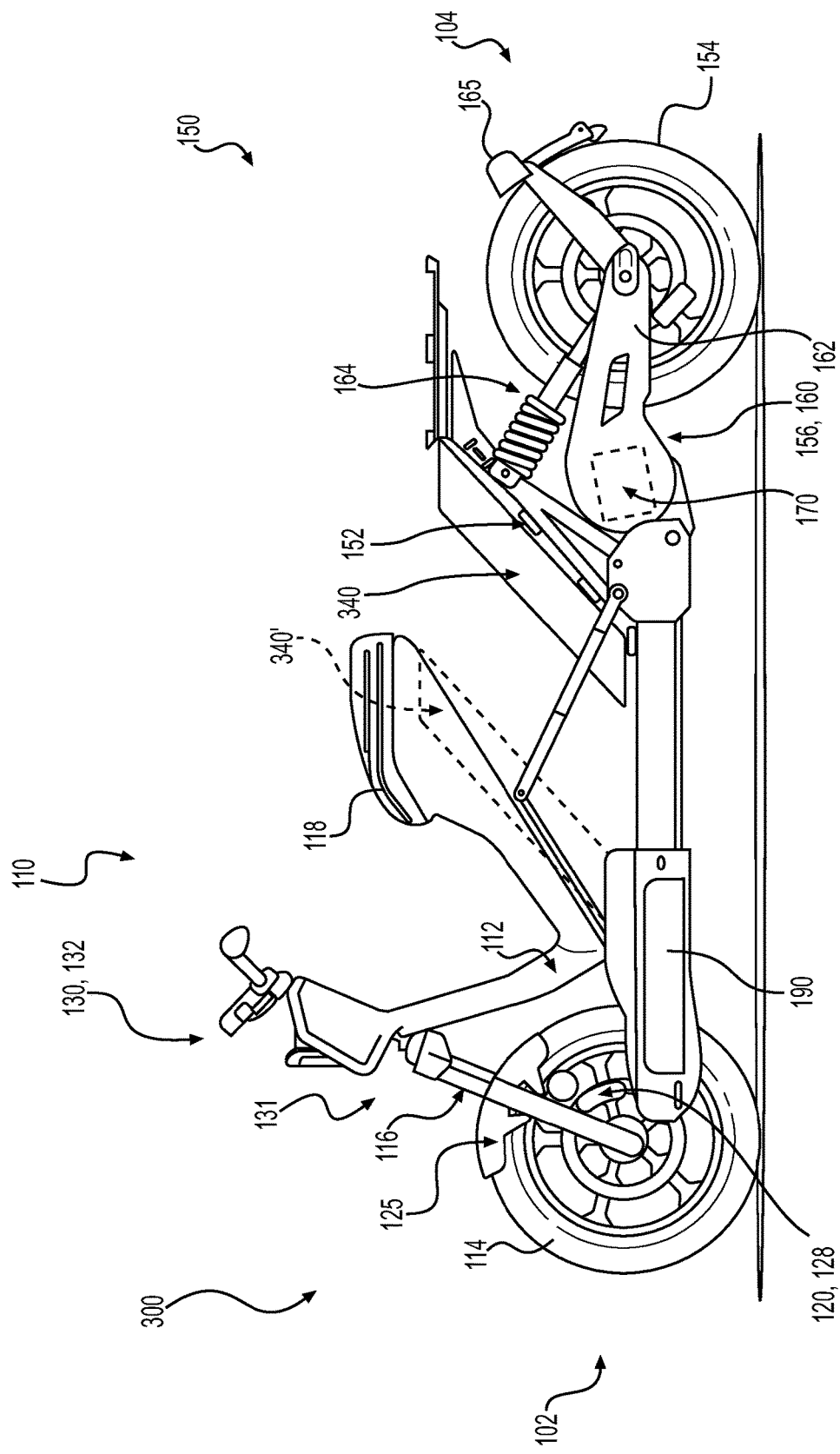
FIG. 8 is a left side elevation view of another vehicle according to the present technology, with the vehicle in an extended position.

Another implementation of a vehicle 300 in accordance with the present technology is illustrated in FIG. 8. Elements of the vehicle 300 that are similar to those of the vehicle 100 retain the same reference numeral and will generally not be described again.

The vehicle 300 includes a battery 340 connected to and supported by the rear frame portion 152. As such, there is no longer an issue of transmitting power from the front module 110 to the rear module 150, as both the battery 340 and the electric motor assembly 170 are both disposed in the rear module 150.

The position of the battery 340 when the vehicle 300 is in the retracted position is illustrated by the outline 340'. The battery 340 is disposed at least partially under the seat 118 in at least one extension position of the front module 110 relative to the rear module 150, specifically the retracted position.

Figure 9:
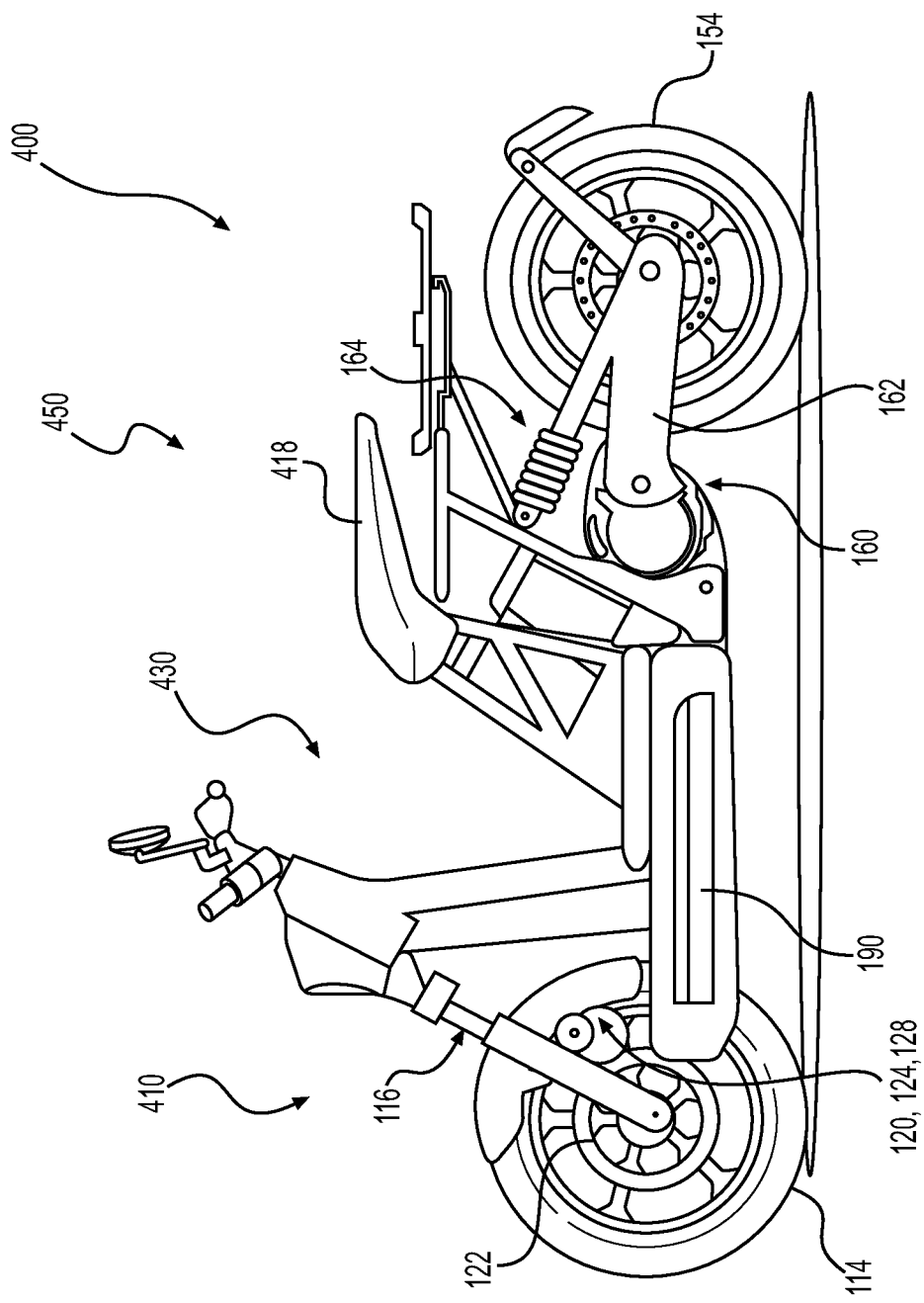
FIG. 9 is a left side elevation view of yet another vehicle according to the present technology, with the vehicle in a retracted position.
Figure 10:
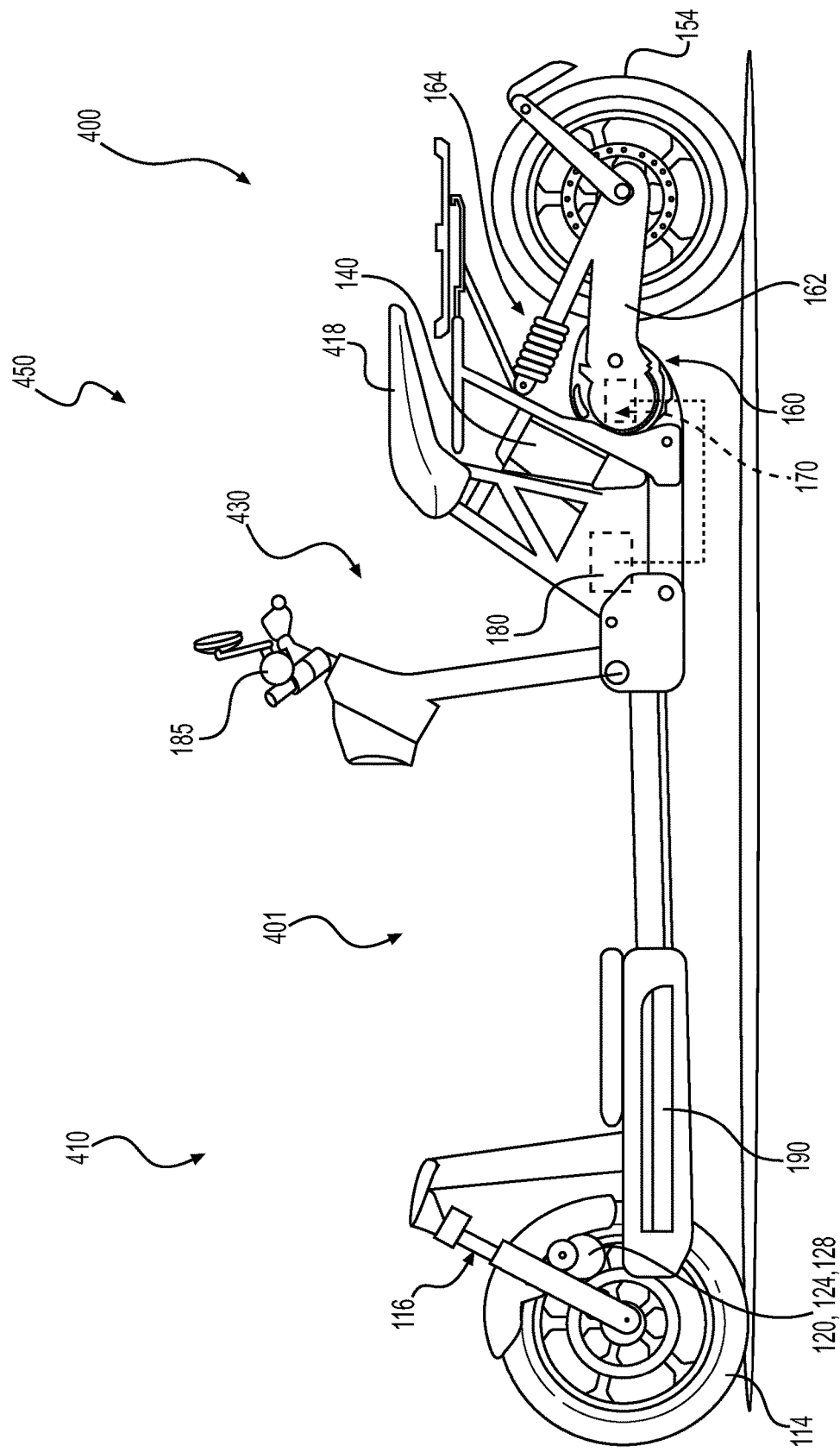
FIG. 10 is a left side elevation view of the vehicle of FIG. 9, with the vehicle in an extended position.

Another implementation of a vehicle 400 according to the present technology is illustrated in FIGS. 9 and 10. Elements of the vehicle 400 that are similar to those of the vehicle 100 retain the same reference numeral and will generally not be described again.

Similarly to vehicle 100 as described above, the vehicle 400 includes a front module 410 and a rear module 450 that is selectively moveably connected to the front module 410, such that a storage space 401 can be selectively defined in the vehicle 400.

In the vehicle 400, a seat 418 for the driver and a steering assembly 430 for steering the vehicle 400 are part of the rear module 450. As such the storage space 401 is formed forward of the seat 418, the steering assembly 430, and the mode selector 185 connected to the steering assembly 430, as is illustrated in FIG. 10. The storage space 401 is specifically formed between the seat 418 and the front wheel 114. The steering assembly 430 is operatively connected to the front wheel 114 and the front suspension assembly 116 via the extension assemblies 190. Specifically, the steering assembly 430 controls the direction turning of the front wheel 114 by a "control-by-wire" system, wiring of which passes through the channel 197 of the left extension assembly 190. In different implementations, different steering control systems could be utilized to control steering between the steering assembly 430 on the rear module 450 and the front wheel 114 including but not limited to an extendable set of mechanical linkages.

In the present implementation, the vehicle control unit 180 communicates with the electric motor assembly 170 via a wireless connection, as is illustrated by the dotted line connection of FIG. 10. It is contemplated that the vehicle control unit 180 and the electric motor assembly 170 could have a hard-wired connection in some implementations.

The vehicles 100, 300, 400, and the method 200 implemented in accordance with some non-limiting implementations of the present technology can be represented as presented in the following numbered clauses.

CLAUSE 1: A vehicle (100, 300, 400), comprising: a front module (110, 410) including: a front frame portion (112); a front suspension assembly (116) connected to the front frame portion (112); at least one front wheel (114) connected to the front frame portion (112) via the front suspension assembly (116); at least one front brake assembly (120) operatively connected to the at least one front wheel (114); a rear module (150) selectively moveably connected to the front module (110, 410), the rear module (150) including: a rear frame portion (152), a rear suspension assembly (160) connected to the rear frame portion (152), at least one rear wheel (154) connected to the rear frame portion (152) via the rear suspension assembly (160), and an electric motor assembly (170) supported by the rear frame portion (152), the electric motor assembly (170) selectively driving the at least one rear wheel (154); a seat (118, 418); a steering assembly (130, 430) disposed forward of the seat (118, 418), the seat (118, 418) and the steering assembly (130, 430) being connected to one of the front module (110, 410) and the rear module (150); a mode selector (185) connected to one of the front module (110, 410) and the rear module (150); a battery (140, 340) connected to one of the front module (110, 410) and the rear module (150), the battery (140, 340) being electrically connected to the electric motor assembly (170); at least one extension assembly (190) connected between the front module (110, 410) and the rear module (150), the at least one extension assembly (190) being selectively extendible and retractable to provide a selective variation in an overall length of the vehicle (100, 300, 400); and a vehicle control unit (180) supported by one of the front module (110, 410) and the rear module (150), the vehicle control unit (180) being communicatively connected between the mode selector (185) and the electric motor assembly (170), the vehicle control unit (180) being adapted for: receiving an indication, via the mode selector (185), to change the overall length of the vehicle (100, 300, 400), determining that the at least one front wheel (114) is rotationally locked, and in response to receiving the indication and determining that the at least one front wheel (114) is rotationally locked, causing the electric motor assembly (170) to drive the at least one rear wheel (154) in order to move the rear module (150) relative to the front module (110, 410).

CLAUSE 2: The vehicle (100, 300, 400) of clause 1, wherein, when the indication to change the overall length of the vehicle (100, 300, 400) is an indication to increase the overall length of the vehicle (100, 300, 400), causing the electric motor assembly (170) to drive the at least one rear wheel (154) includes driving the at least one rear wheel (154) in reverse to move the rear module (150) rearward relative to the front module (110, 410).

CLAUSE 3: The vehicle (100, 300, 400) of clause 1 or 2, wherein, when the indication to change the overall length of the vehicle (100, 300, 400) is an indication to reduce the overall length of the vehicle (100, 300, 400), causing the electric motor assembly (170) to drive the at least one rear wheel (154) includes driving the at least one rear wheel (154) in a forward direction to move the rear module (150) forward relative to the front module (110, 410).

CLAUSE 4: The vehicle (100, 300, 400) of any one of clauses 1 to 3, wherein: the battery (140, 340) is connected to the rear module (150); and the battery (340) is disposed at least partially under the seat (118, 418) in at least one extension position of the front module (110, 410) relative to the rear module (150).

CLAUSE 5: The vehicle (100, 300) of any one of clauses 1 to 4, wherein: the seat (118), the steering assembly (130), the battery (140), and the mode selector (185) are connected to the front module (110); and selectively increasing the overall length of the vehicle (100, 300) creates a space (101) within the vehicle (100, 300) between the seat (118) and the at least one rear wheel (154).

CLAUSE 6: The vehicle (100, 300) of clause 5, further comprising an electrical cord (141) operatively connecting the battery (140) to the electric motor assembly (170); and wherein: the at least one extension assembly (190) defines a channel (197) therethrough, and the electrical cord (141) extends from the front module (110) to the rear module (150) through the channel (197).

CLAUSE 7: The vehicle (100, 300, 400) of clause 6, further comprising a control wire (181) communicatively connecting the vehicle control unit (180) to the electric motor assembly (170), the control wire (181) being connected between the vehicle control unit (180) and the electric motor assembly (170); and wherein: the vehicle control unit (180) is supported by the front module (110, 410), and the control wire (181) extends from the vehicle control unit (180) in the front module (110, 410) to the electric motor assembly (170) in the rear module (150) via the channel (197) in the at least one extension assembly (190).

CLAUSE 8: The vehicle (100, 300, 400) of any one of clauses 1 to 3, wherein: the seat (118, 418), the steering assembly (430), the battery (140), and the mode selector (185) are connected to the rear module (150); and selectively increasing the overall length of the vehicle (100, 300, 400) creates a space within the vehicle (100, 300, 400) between the at least one front wheel (114) and the seat (118, 418).

CLAUSE 9: The vehicle (100, 300, 400) of any one of clauses 1 to 8, wherein the at least one extension assembly (190) includes: a right extension assembly (190) connected between a right side of the front frame portion (112) and a right side of the rear frame portion (152); and a left extension assembly (190) connected between a left side of the front frame portion (112) and a left side of the rear frame portion (152).

CLAUSE 10: The vehicle (100, 300, 400) of clause 1, wherein the at least one extension assembly (190) includes at least one telescoping element (196).

CLAUSE 11: The vehicle (100, 300, 400) of clause 1, further comprising at least one sensor (198) communicatively connected to the vehicle control unit (180) for sensing at least one of: an extension position of the at least one extension assembly (190); and a position of the front module (110, 410) relative to the rear module (150).

CLAUSE 12: The vehicle (400) of clause 1, wherein the vehicle control unit (180) communicates with the electric motor assembly (170) via a wireless connection.

CLAUSE 13: The vehicle (100, 300, 400) of clause 1, wherein the rear suspension assembly (160) includes a swing arm (162) pivotably connected to the rear frame portion (152).

CLAUSE 14: The vehicle (100, 300, 400) of clause 1, wherein: the at least one front wheel (114) is a single front wheel (114); and the front suspension assembly (116) includes a fork suspension (116) supporting the front wheel (114).

CLAUSE 15: The vehicle (100, 300) of clause 1, wherein the steering assembly (130) includes: a steering column (131); a handlebar (132) connected to a top end of the steering column (131); and a twist grip throttle (133) operatively connected to the handlebar (132).

CLAUSE 16: The vehicle (100, 300, 400) of clause 1, wherein: the vehicle control unit (180) is further adapted for actuating the at least one front brake assembly (120) to rotationally lock the at least one front wheel (114); and determining that the at least one front wheel (114) is rotationally locked includes actuating the at least one front brake assembly (120) to rotationally lock the at least one front wheel (114).

CLAUSE 17: The vehicle (100, 300, 400) of clause 1, further comprising at least one brake sensor (128) operatively connected to the at least one front brake assembly (120), the at least one brake sensor (128) being communicatively connected to the vehicle control unit (180), the at least one brake sensor (128) being operable to send a signal, to the vehicle control unit (180), indicating that the at least one front wheel (114) is rotationally locked by the at least one front brake assembly (120).

CLAUSE 18: The vehicle (100, 300, 400) of clause 1, further comprising a speed sensor (172) for sensing a speed of the vehicle (100, 300, 400), the speed sensor (172) being communicatively connected to the vehicle control unit (180), the speed sensor (172) being operable to send a signal, to the vehicle control unit (180), indicating that the vehicle (100, 300, 400) is immobilized prior to causing the electric motor assembly (170) to drive the at least one rear wheel (154).

CLAUSE 19: The vehicle (100, 300, 400) of clause 1, wherein the at least one extension assembly (190) includes at least one lock (199) for locking an extension position of the at least one extension assembly (190).

CLAUSE 20: A method (200) for selectively changing an overall length of a vehicle (100, 300, 400), the method (200) comprising: receiving (210), by a vehicle control unit (180), from a mode selector (185), an indication to change the overall length of the vehicle (100, 300, 400), the vehicle (100, 300, 400) including a front module (110, 410) and a rear module (150) connected together by at least one extension assembly (190), the front module (110, 410) including: at least one front wheel (114), and at least one front brake assembly (120) operatively connected to the at least one front wheel (114); determining (220), by the vehicle control unit (180), that the at least one front wheel (114) is rotationally locked; and causing (230), by the vehicle control unit (180), an electric motor assembly (170) of the rear module (150) to drive at least one rear wheel (154) of the rear module (150) such that the rear module (150) translates relative to the front module (110, 410).

CLAUSE 21: The method (200) of clause 20, wherein determining (220) that the at least one front wheel (114) is rotationally locked includes determining that the at least one front brake assembly (120) has been actuated to brake the at least one front wheel (114).

CLAUSE 22: The method (200) of clause 20, wherein determining (220) that the at least one front wheel (114) is rotationally locked includes actuating the at least one front brake assembly (120) to rotationally lock the at least one front wheel (114).

CLAUSE 23: The method (200) of clause 20, wherein determining (220) that the at least one front wheel (114) is rotationally locked further includes: detecting that the at least one front wheel (114) is not rotationally locked, and in response to detecting that the at least one front wheel (114) is not rotationally locked, actuating the at least one front brake assembly (120) to rotationally lock the at least one front wheel (114).

CLAUSE 24: The method (200) of clause 20, further comprising causing, by the vehicle control unit (180), the at least one front brake assembly (120) to actuate to brake the at least one front wheel (114), prior to causing the electric motor assembly (170) to drive the at least one rear wheel (154).

CLAUSE 25: The method (200) of clause 24, further comprising causing, by the vehicle control unit (180), the at least one front brake assembly (120) to release the at least one front wheel (114) to rotationally unlock the at least one front wheel (114), subsequent to causing the electric motor assembly (170) to drive the at least one rear wheel (154).

CLAUSE 26: The method (200) of clause 20, further comprising, determining by the vehicle control unit (180) that the vehicle (100, 300, 400) is immobilized, prior to causing the electric motor assembly (170) to drive the at least one rear wheel (154).

CLAUSE 27: The method (200) of clause 20, further comprising causing, by the vehicle control unit (180), the at least one extension assembly (190) to unlock, prior to causing the electric motor assembly (170) to drive the at least one rear wheel (154); and wherein when unlocked, the at least one extension assembly (190) is capable of at least one of selectively extending and selectively retracting.

CLAUSE 28: The method (200) of clause 27, further comprising causing, by the vehicle control unit (180), the at least one extension assembly (190) to lock, subsequent to causing the electric motor assembly (170) to drive the at least one rear wheel (154); and wherein when locked, the at least one extension assembly (190) has a fixed length and impedes changes in the overall length of the vehicle (100, 300, 400).

CLAUSE 29: The method (200) of clause 20, wherein causing the electric motor assembly (170) to drive the at least one rear wheel (154) includes causing the electric motor assembly (170) to drive the at least one rear wheel (154) in reverse in order to increase the overall length of the vehicle (100, 300, 400) and to cause the at least one extension assembly (190) to extend.

CLAUSE 30: The method (200) of clause 20, wherein causing the electric motor assembly (170) to drive the at least one rear wheel (154) includes causing the electric motor assembly (170) to drive the at least one rear wheel (154) forward in order to decrease the overall length of the vehicle (100, 300, 400) and to cause the at least one extension assembly (190) to retract.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle, comprising:
    a front module including:
        a front frame portion,
        a front suspension assembly connected to the front frame portion,
        at least one front wheel connected to the front frame portion via the front suspension assembly, and
        at least one front brake assembly operatively connected to the at least one front wheel;
    a rear module selectively moveably connected to the front module, the rear module including:
        a rear frame portion,
        a rear suspension assembly connected to the rear frame portion,
        at least one rear wheel connected to the rear frame portion via the rear suspension assembly, and
        an electric motor assembly supported by the rear frame portion, the electric motor assembly selectively driving the at least one rear wheel;
    a seat;
    a steering assembly disposed forward of the seat,
    the seat and the steering assembly being connected to one of the front module and the rear module;
    a mode selector connected to one of the front module and the rear module;
    a battery connected to one of the front module and the rear module, the battery being electrically connected to the electric motor assembly;
    at least one extension assembly connected between the front module and the rear module, the at least one extension assembly being selectively extendible and retractable to provide a selective variation in an overall length of the vehicle; and
    a vehicle control unit supported by one of the front module and the rear module, the vehicle control unit being communicatively connected between the mode selector and the electric motor assembly,
    the vehicle control unit being adapted for:
        receiving an indication, via the mode selector, to change the overall length of the vehicle,
        determining that the at least one front wheel is rotationally locked, and
        in response to receiving the indication and determining that the at least one front wheel is rotationally locked, causing the electric motor assembly to drive the at least one rear wheel in order to move the rear module relative to the front module.

2. The vehicle of claim 1, wherein, when the indication to change the overall length of the vehicle is an indication to increase the overall length of the vehicle, causing the electric motor assembly to drive the at least one rear wheel includes driving the at least one rear wheel in reverse to move the rear module rearward relative to the front module.

3. The vehicle of claim 1, wherein, when the indication to change the overall length of the vehicle is an indication to reduce the overall length of the vehicle, causing the electric motor assembly to drive the at least one rear wheel includes driving the at least one rear wheel in a forward direction to move the rear module forward relative to the front module.

4. The vehicle of claim 1, wherein:
    the battery is connected to the rear module; and the battery is disposed at least partially under the seat in at least one extension position of the front module relative to the rear module.

5. The vehicle of claim 1, wherein:
the seat, the steering assembly, the battery, and the mode selector are connected to the front module; and
selectively increasing the overall length of the vehicle creates a space within the vehicle between the seat and the at least one rear wheel.

6. The vehicle of claim 5, further comprising an electrical cord operatively connecting the battery to the electric motor assembly; and
wherein:
the at least one extension assembly defines a channel therethrough, and
the electrical cord extends from the front module to the rear module through the channel.

7. The vehicle of claim 6, further comprising a control wire communicatively connecting the vehicle control unit to the electric motor assembly, the control wire being connected between the vehicle control unit and the electric motor assembly; and
wherein:
the vehicle control unit is supported by the front module, and
the control wire extends from the vehicle control unit in the front module to the electric motor assembly in the rear module via the channel in the at least one extension assembly.

8. The vehicle of claim 1, wherein:
the seat, the steering assembly, the battery, and the mode selector are connected to the rear module; and
selectively increasing the overall length of the vehicle creates a space within the vehicle between the at least one front wheel and the seat.

9. The vehicle of claim 1, further comprising at least one sensor communicatively connected to the vehicle control unit for sensing at least one of:
an extension position of the at least one extension assembly; and
a position of the front module relative to the rear module.

10. The vehicle of claim 1, wherein:
the vehicle control unit is further adapted for actuating the at least one front brake assembly to rotationally lock the at least one front wheel; and
determining that the at least one front wheel is rotationally locked includes actuating the at least one front brake assembly to rotationally lock the at least one front wheel.

11. The vehicle of claim 1, further comprising at least one brake sensor operatively connected to the at least one front brake assembly, the at least one brake sensor being communicatively connected to the vehicle control unit, the at least one brake sensor being operable to send a signal, to the vehicle control unit, indicating that the at least one front wheel is rotationally locked by the at least one front brake assembly.

12. The vehicle of claim 1, further comprising a speed sensor for sensing a speed of the vehicle, the speed sensor being communicatively connected to the vehicle control unit, the speed sensor being operable to send a signal, to the vehicle control unit, indicating that the vehicle is immobilized prior to causing the electric motor assembly to drive the at least one rear wheel.

13. The vehicle of claim 1, wherein the at least one extension assembly includes at least one lock for locking an extension position of the at least one extension assembly.

14. A method for selectively changing an overall length of a vehicle, the method comprising:
receiving, by a vehicle control unit, from a mode selector, an indication to change the overall length of the vehicle,
the vehicle including a front module and a rear module connected together by at least one extension assembly,
the front module including:
at least one front wheel, and
at least one front brake assembly operatively connected to the at least one front wheel;
determining, by the vehicle control unit, that the at least one front wheel is rotationally locked; and
causing, by the vehicle control unit, an electric motor assembly of the rear module to drive at least one rear wheel of the rear module such that the rear module translates relative to the front module.

15. The method of claim 14, wherein determining that the at least one front wheel is rotationally locked includes determining that the at least one front brake assembly has been actuated to brake the at least one front wheel.

16. The method of claim 14, wherein determining that the at least one front wheel is rotationally locked includes actuating the at least one front brake assembly to rotationally lock the at least one front wheel.

17. The method of claim 14, further comprising:
causing, by the vehicle control unit, the at least one front brake assembly to actuate in order to brake the at least one front wheel, prior to causing the electric motor assembly to drive the at least one rear wheel.

18. The method of claim 14, further comprising, determining by the vehicle control unit that the vehicle is immobilized, prior to causing the electric motor assembly to drive the at least one rear wheel.

19. The method of claim 14, further comprising causing, by the vehicle control unit, the at least one extension assembly to unlock, prior to causing the electric motor assembly to drive the at least one rear wheel; and
wherein when unlocked, the at least one extension assembly is capable of at least one of selectively extending and selectively retracting.

20. The method of claim 19, further comprising causing, by the vehicle control unit, the at least one extension assembly to lock, subsequent to causing the electric motor assembly to drive the at least one rear wheel; and
wherein when locked, the at least one extension assembly has a fixed length and impedes changes in the overall length of the vehicle.

21. The method of claim 14, wherein causing the electric motor assembly to drive the at least one rear wheel includes causing the electric motor assembly to drive the at least one rear wheel in reverse in order to increase the overall length of the vehicle and to cause the at least one extension assembly to extend.

22. The method of claim 14, wherein causing the electric motor assembly to drive the at least one rear wheel includes causing the electric motor assembly to drive the at least one rear wheel forward in order to decrease the overall length of the vehicle and to cause the at least one extension assembly to retract.

* * * * *